United States Patent Office 3,239,503
Patented Mar. 8, 1966

3,239,503
AZIDO BENZENESULFONYL SEMICARBAZIDES
Gerhard Korger and Rudi Weyer, Frankfurt am Main, Walter Aümuller, Kelkheim, Taunus, and Erich Haack, Heidelberg, Germany, assignors to Farbwerke Hoechst Aktiengesellschaft vormals Meister Lucius & Brüning, Frankfurt am Main, Germany, a corporation of Germany
No Drawing. Filed Aug. 20, 1962, Ser. No. 218,106
Claims priority, application Germany, Aug. 22, 1961, F 34,750
4 Claims. (Cl. 260—239)

It is known that certain benzenesulfonyl urea derivatives exhibit hypoglycemic properties and, therefore, are suitable for use as antidiabetics to be administered per os (cf. Arzneimittelforschung, vol. 8 (1958), pages 444–454).

We have found that 4-benzenesulfonyl-1,1-alkylene-semicarbazides of the general formula

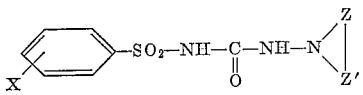

wherein X represents a trifluoromethyl or an azido group and —Z—Z'— represents an alkylene chain containing from 3 to 7 carbon atoms which may—if desired—be substituted by further low molecular alkyl radicals, and the salts of these compounds possess hypoglycemic properties.

The present invention relates to the preparation of such 4-benzenesulfonyl - 1,1 - alkylene-semicarbazides advantageously according to the following processes.

It is possible, for instance, to react correspondingly substituted benzenesulfonyl isocyanates with N,N-alkylene-hydrazines or in a reverse reaction to react correspondingly substituted benzenesulfonamides with N,N-alkylene-imino-isocyanates. Instead of benzenesulfonyl isocyanates and N,N-alkylene-imino-isocyanates, in general there may also be used compounds which in the course of the reaction form the above-mentioned isocyanates or which react like such isocyanates. It is also possible to react correspondingly substituted benzenesulfonyl carbamic acid esters or the corresponding monothio-carbamic acid esters which in the ester component contain a low molecular alkyl or aryl radical with N,N-alkylene-hydrazines, or conversely, to react N,N-alkylene-hydrazino-N'-carbonic acid esters which in the ester component contain a low molecular alkyl or phenyl radical or the corresponding hydrazino-monothio-carbonic acid esters with benzene-sulfonamides. Carbamic acid halides may also be used with favourable results. Thus, the desired compounds may be obtained from correspondingly substituted benzenesulfonyl carbamic acid halides and N,N-alkylene-hydrazines, or vice versa from N,N-alkylene-hydrazino-N'-carbonic acid halides and the corresponding benzenesulfonamides. Furthermore, benzenesulfonyl ureas which are unsubstituted on the side of the urea molecule opposite to the sulfonyl group, or mono- or disubstituted by other low molecular alkyl or aryl radicals may be converted into the desired compounds when reacted with N,N-alkylene-hydrazines per se or in the form of their salts. Instead of the benzenesulfonyl ureas mentioned above, also corresponding N-benzenesulfonyl-N'-acyl ureas or bis-(benzenesulfonyl)-ureas can be used as starting substances for the reaction with suitable N,N-alkylene-hydrazines. It is, furthermore, possible to use as starting materials $N^1,N^1$-alkylene-semicarbazides which may be substituted at the $N^4$-nitrogen atom by a preferably low molecular aliphatic or aromatic acid radical and to react such compounds with correspondingly substituted benzenesulfonamides.

Furthermore, it is also possible to prepare the desired products from the corresponding benzenesulfonyl-thio-semicarbazides by desulfurization, for example, by means of oxides or heavy metal salts, or by means of oxidizing agents as, for example, hydrogen peroxide, sodium peroxide and nitrous acid. It is also possible to split the 1-benzenesulfonyl-3-N,N-alkylene-imino-parabanic acids by hydrolysis.

In the process of the present invention there may be used as starting materials o, m, p-azido or trifluoromethyl-benzenesulfonic acid derivatives, such as isocyanates, amides, carbamic acid esters, ureas and thioureas. There may be mentioned for example: o, m, p-azido-benzenesulfonic acid amide, o, m, p-trifluoromethyl-benzenesulfonamide, o, m, p-azido-benzenesulfonyl carbamic acid esters, o, m, p-trifluoromethyl-benzenesulfonyl carbamic acid esters, o, m, p-azido-benzenesulfonyl ureas, o, m, p-trifluoromethyl-benzenesulfonyl ureas, o, m, p-trifluoromethyl-benzenesulfonyl isocyanates. The azido-benzenesulfonyl or trifluoromethyl-benzenesulfonyl derivatives can be preparer according to various methods and processes known from the relevant literature.

For the reaction with said benzenesulfonyl derivatives there may be used in the process of the present invention the hydrazines of the general formula

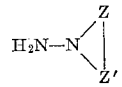

for example, N,N-trimethylene hydrazine, N,N-α-methyl-trimethylene hydrazine, N,N-α,α-dimethyl-trimethylene hydrazine, N,N-tetramethylene hydrazine, N,N-α-methyl-tetramethylene-hydrazine, N,N-α,α'-dimethyl-tetramethylene hydrazine, N,N-α,γ-dimethyl-tetramethylene hydrazine, N,N-pentamethylene hydrazine, N,N-α-methyl-pentamethylene hydrazine, N,N-β-methylpentamethylene-hydrazine, N,N-γ-methyl-pentamethylene hydrazine, N,N-α,α'-dimethyl-pentamethylene hydrazine, N,N-hexamethylene hydrazine, N,N-heptamethylene hydrazine. The above-mentioned hydrazines are to a large extent known in the art and can be prepared by reacting the corresponding alkylene-imines with nitrous acid and by reducing the so obtained nitroso compounds by means of zinc dust in acid solution or by means of lithium-aluminum hydrides. These hydrazines can be used as starting materials for preparing the corresponding imino-isocyanates, hydrazino carbonic acid esters, hydra-zino carbonic acid halides, semicarbazides and acyl-semi-carbazides in usual manner.

The methods of operation of the process according to the invention may be varied to a large extent as concerns the reaction conditions. The reactions may be carried out, for example, while using solvents, at room temperature or at an elevated temperature.

In order to obtain the products in a form as pure as possible, they are separated as completely as possible from the benzenesulfonamides used as starting substances or formed in the course of the reaction. This separation may be favourably effected by taking up the products according to the invention in strongly diluted ammonia, filtering off any undissolved matter and recovering the desired products by acidification, advantageously by means of organic acids such as dilute acetic acid.

The 4-benzenesulfonyl-1,1-alkylene-semicarbazides obtained according to the process of the present invention are valuable medicaments which are characterized, in particular, by a strong hypoglycemic action and very low toxicity. Thus, a lowering of the blood sugar level by 30% could still be detected 24 hours after the peroral application of 4-(4-azido-benzenesulfonyl)-1,1-(γ-methyl-pentamethylene)-semicarbazide or of 4-(4-azido-benzenesulfonyl)-1,1-hexamethylene-semicarbazide to a rabbit in a dose of 400 mg./kg. of body weight. This long lasting hypoglycemic action of the products of the present invention is very surprising, since the known anti-diabetics to be administered per os, rapidly lose their activity after having exceeded their maximum of action which occurs 3–6 hours after being applied.

Therefore, the application of the products of the present invention is of special interest in therapeutics, since these products cause a considerable lowering of the blood sugar level by the application of an essentially smaller number of single doses.

The products of the present invention are preferably used for the manufacture of preparations showing hypoglycemic action to be orally administered in the treatment of diabetes mellitus. The sulfonyl-semicarbazides can be used as such or in the form of their salts in addition with bases or acids or in the presence of substances that cause salt formation. For the salt formation may be used, e.g., alkaline agents such as for example, alkali metal or alkaline earth metal hydroxides, carbonates or bicarbonates and physiologically tolerable organic bases, furthermore, acids such as hydrochloric acid, hydrobromic acid, sulfuric acid and amidosulfonic acid.

As medicinal preparations there enter into consideration preferably tablets containing the products of the invention and, in addition thereto, the usual adjuvants and carriers such as for example, talc, starch, lactose, tragacanth or magnesium stearate.

The following examples serve to illustrate the invention, but they are not intended to limit it thereto:

*Example 1.—4-(4-azido-benzenesulfonyl)-1,1-hexamethylene-semicarbazide*

38.4 grams of N-(4-azido-benzenesulfonyl)-carbamic acid methyl ester were mixed with 17.1 grams of N,N-hexamethylene-hydrazine and heated for 35 minutes at 125–130° C. on the oil bath. The solid reaction product was recrystallized twice from acetic ester. There was obtained the 4-(4-azido-benzenesulfonyl)-1,1-hexamethylene-semicarbazide melting at 163–164° C. (with decomposition).

*Example 2.—4-(4-azido-benzenesulfonyl)-1,1-pentamethylene-semicarbazide*

32.4 grams of N-(4-azido-benzenesulfonyl)-carbamic acid methyl ester were mixed with 13 grams of N,N-pentamethylene-hydrazine and heated for 30 minutes at 125° C. on the oil bath. The reaction product was then recrystallized twice from acetic ester. There was obtained the 4 - (4 - azido-benzenesulfonyl)-1,1-pentamethylene-semicarbazide melting at 170–171° C. (with decomposition).

With the use of N,N-tetramethylene-hydrazine there was obtained in an analogous manner the 4-(4-azido-benzenesulfonyl)-1,1-tetramethylene-semicarbazide.

*Example 3.—4-(3-trifluoromethyl-benzenesulfonyl)-1,1-pentamethylene-semicarbazide*

28.3 grams of m-(trifluoromethyl-benzenesulfonyl)-carbamic acid methyl ester were heated together with 10.5 grams of N-aminopiperidine for 30 minutes at 115° C. on the oil bath. There was obtained a clear melt which slowly became semi-solid while methanol was formed. The product so obtained was allowed to cool and recrystallized from water/ethanol. The 4-(3-trifluoromethyl - benzenesulfonyl) - 1,1-pentamethylene-semicarbazide melted at 171–173° C.

*Example 4.—4-(3-trifluoromethyl-benzenesulfonyl)-1,1-hexamethylene-semicarbazide*

28.3 grams of m-(trifluoromethyl-benzenesulfonyl)-carbamic acid methyl ester were mixed with 11.4 grams of N-amino-hexamethylene-imine and heated for 30 minutes at 120° C. on the oil bath. First a melt was formed which solidified subsequently. After cooling, the 4-(3-trifluoromethyl - benzenesulfonyl)-1,1-hexamethylene-semicarbazide was recrystallized from water/ethanol and melted at 159–161° C.

*Example 5.—4-(3-trifluoromethyl-benzenesulfonyl)-1,1-tetramethylene-semicarbazide*

17 grams of m-(trifluoromethyl-benzenesulfonyl)-carbamic acid methyl ester were mixed with 5.2 grams of N-aminopyrrolidine and heated for 30 minutes at 120° C. on the oil bath. Methanol escaped from the melt formed—while foaming up—and the substance solidified. After recrystallization from ethanol/water the 4-(3-trifluoromethyl-benzenesulfonyl)-1,1-tetramethylene-semicarbazide melted at 175–177° C.

*Example 6.—4-(3-trifluoromethyl-benzenesulfonyl)-1,1-(α,α-dimethyl-trimethylene)-semicarbazide*

14.2 grams of m-(trifluoromethyl-benzenesulfonyl)-carbamic acid methyl ester were mixed with 5 grams of N-amino-α,α-dimethyl-azetidine and heated at 100° C. on the oil bath. After 20 minutes the mass became semisolid while methanol was formed. After cooling, the substance thus obtained was recrystallized from water/ethanol. The so obtained 4-(3-trifluoromethyl-benzenesulfonyl) - 1,1-(α,α-dimethyl-trimethylene)-semicarbazide melted at 151–152° C.

*Example 7.—4-(3-trifluoromethyl-benzenesulfonyl)-1,1-pentamethylene-semicarbazide*

9.7 grams of m-(trifluoromethyl-benzenesulfonyl)-isocyanate were dissolved in 30 cc. of absolute ether and slowly added dropwise—while cooling and shaking—to a solution of 5 grams of N-amino-piperidine in about 30 cc. of absolute ether. The drop-wise addition being terminated, the mixture was allowed to stand for some time, the separated 4-(3-trifluoromethyl-benzenesulfonyl)-1,1-pentamethylene-semicarbazide was then filtered off with suction and recrystallized from water/ethanol, melting point 171–172° C.

*Example 8.—4-(4-azido-benzenesulfonyl)-1,1-hexamethylene-semicarbazide*

24.1 grams of N-(4-azido-benzenesulfonyl)-urea melting point 168–170° C. (prepared by reacting 4-azido-benzenesulfonamide with potassium cyanate in boiling aqueous ethanol) were boiled under reflux for 1 hour in 250 cc. of dioxane with 22.8 grams of N,N-hexamethylene-hydrazine. The reaction mixture was concentrated in vacuo, the residue was taken up in dilute ammonia, filtered and clarified with charcoal, and the filtrate was acidified with dilute acetic acid. The separated precipitate was filtered off with suction, dried and recrystallized from acetic ester. There was obtained the 4-(4-azido-benzenesulfonyl)-1,1-hexamethylene-semicarbazide melting at 163–164° C.

*Example 9.—4-(4-azido-benzenesulfonyl)-1,1-(γ-methyl-pentamethylene)-semicarbazide*

38.4 grams of 4-azido-benzenesulfonyl-methyl-urethane were mixed well with 17.1 grams of 1-amino-4-methyl-piperidine. A thick pulp was formed which was heated for 25 minutes at 110–115° C. (external temperature). The reaction mixture first liquefied and then became solid. After cooling, it was dissolved in dilute ammonia (1:50), filtered with charcoal and acidified with dilute acetic acid. The precipitate was filtered off with suction and recrystallized from acetone. The 4-(4-azido-benzenesulfonyl) - 1,1 - (γ - methyl-pentamethylene)-semicarbazide melted at 187–189° C. with decomposition.

We claim:

1. 4 - (4 - azido-benzenesulfonyl)-1,1-(γ-methyl-pentamethylene)-semicarbazide.

2. 4 - (4 - azido - benzenesulfonyl)-1,1-hexamethylene-semicarbazide.

3. 4 - (4 - azido-benzenesulfonyl)-1,1-pentamethylene-semicarbazide.

4. 4 - (4 - azido - benzenesulfonyl)-1,1-tetramethylene-semicarbazide.

References Cited by the Examiner

UNITED STATES PATENTS 3,015,673  1/1962  Zahler.
3,063,903  11/1962  Wright _____ 260—239

OTHER REFERENCES

Blank et al., J. Org. Chem., vol. 26, pages 1551–1553 (1961).

Haack, Arz. Forsch., vol. 8, pages 444 to 447 (1958).
Yale, J. of Med. and Pharm. Chem., vol. 1, No. 2, pages 121 to 133 (1959).
Yale et al., J. Org. Chem., vol. 25, pages 1824–1826 (1960).

WALTER A. MODANCE, *Primary Examiner.*

IRVING MARCUS, *Examiner.*